United States Patent
Ito et al.

(10) Patent No.: US 10,296,014 B2
(45) Date of Patent: May 21, 2019

(54) BOAT MANEUVERING CONTROL METHOD FOR BOAT AND BOAT MANEUVERING CONTROL SYSTEM FOR BOAT

(71) Applicant: YAMAHA HATSUDOKI KABUSHIKI KAISHA, Iwata-shi, Shizuoka (JP)

(72) Inventors: Makoto Ito, Shizuoka (JP); Sebastian Nilsson, Gothenburg (SE); Mathias Lindeborg, Gothenburg (SE)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 219 days.

(21) Appl. No.: 15/346,888

(22) Filed: Nov. 9, 2016

(65) Prior Publication Data
US 2017/0139426 A1   May 18, 2017

(30) Foreign Application Priority Data
Nov. 17, 2015   (JP) .................................. 2015-224677

(51) Int. Cl.
| | |
|---|---|
| *B63H 25/42* | (2006.01) |
| *G05D 1/08* | (2006.01) |
| *B63H 21/21* | (2006.01) |
| *G01C 21/20* | (2006.01) |
| *B63J 99/00* | (2009.01) |

(52) U.S. Cl.
CPC ........... *G05D 1/0875* (2013.01); *B63H 21/21* (2013.01); *B63H 25/42* (2013.01); *G01C 21/20* (2013.01); *B63J 2099/006* (2013.01); *B63J 2099/008* (2013.01)

(58) Field of Classification Search
CPC ............... G05D 1/0206; G05D 1/0875; B63J 2099/008; B63H 25/42; B63B 35/81; B63B 2035/009
USPC ............................. 701/21; 114/242; 441/65
See application file for complete search history.

(56) References Cited

U.S. PATENT DOCUMENTS

| | | | |
|---|---|---|---|
| 7,305,928 B2 | 12/2007 | Bradley et al. | |
| 7,366,593 B2 * | 4/2008 | Fujimoto ............. | G05D 1/0206 701/21 |
| 7,727,036 B1 | 6/2010 | Poorman et al. | |
| 8,150,569 B2 * | 4/2012 | Kaji ..................... | G05D 1/0206 114/144 E |
| 8,924,054 B1 * | 12/2014 | Arbuckle .............. | B63H 21/21 701/21 |
| 9,039,468 B1 | 5/2015 | Arbuckle et al. | |
| 2003/0191562 A1 * | 10/2003 | Robertson ............ | B63H 25/42 701/21 |

(Continued)

FOREIGN PATENT DOCUMENTS

| | | |
|---|---|---|
| JP | 2008-247102 A | 10/2008 |
| JP | 2012-245979 A | 12/2012 |

*Primary Examiner* — Dalena Tran
(74) *Attorney, Agent, or Firm* — Keating and Bennett, LLP

(57) ABSTRACT

A boat maneuvering control method for a boat provided with a propulsion device includes acquiring a target orientation, acquiring an actual orientation of the boat, setting a target yaw rate value based on orientation information of at least one of the target orientation and the actual orientation, detecting an actual yaw rate value of the boat, and controlling a direction of a thrust force of the propulsion device based on the target yaw rate value and the actual yaw rate value.

18 Claims, 7 Drawing Sheets

(56) References Cited

U.S. PATENT DOCUMENTS

2009/0117788 A1 5/2009 Kaji
2010/0023192 A1 1/2010 Rae et al.

* cited by examiner

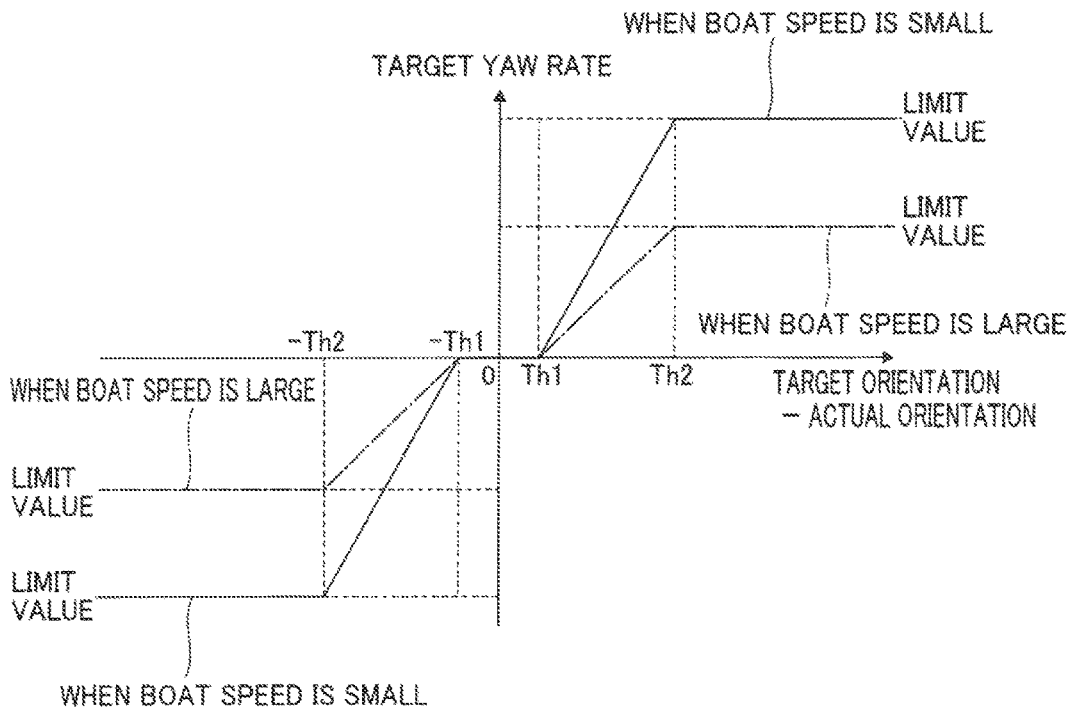
FIG.4 RELATIONSHIP BETWEEN DIFFERENCE BETWEEN TARGET ORIENTATION AND ACTUAL ORIENTATION AND TARGET YAW RATE (DURING ORIENTATION CONTROL)
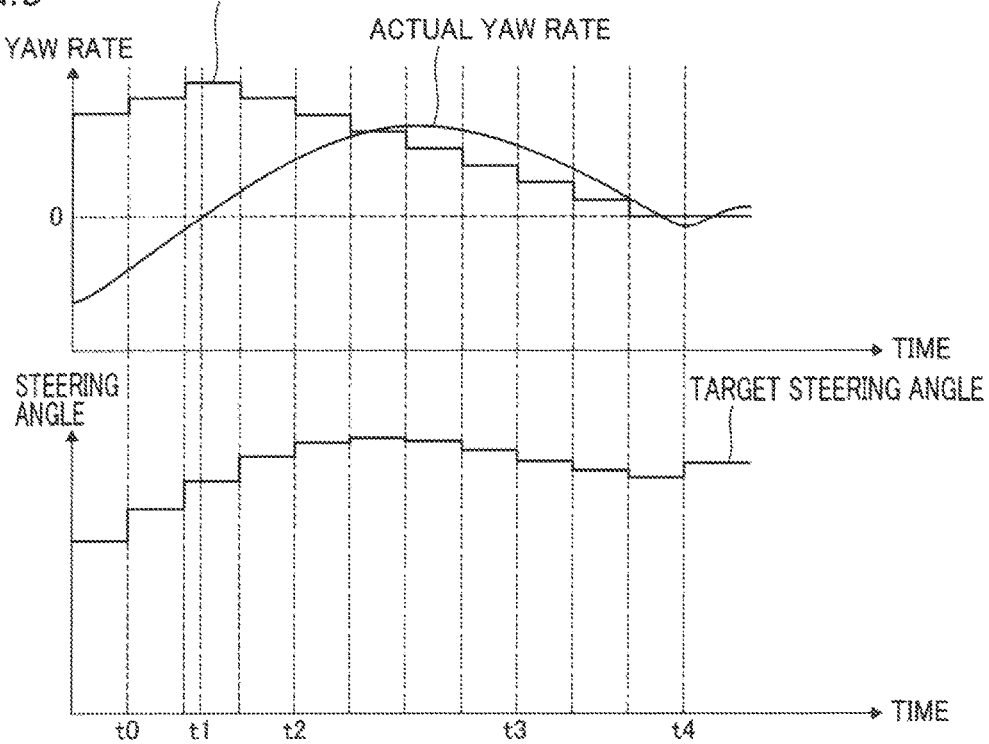
FIG.5

FIG. 6  EXAMPLE OF OPERATION OF ORIENTATION CONTROL
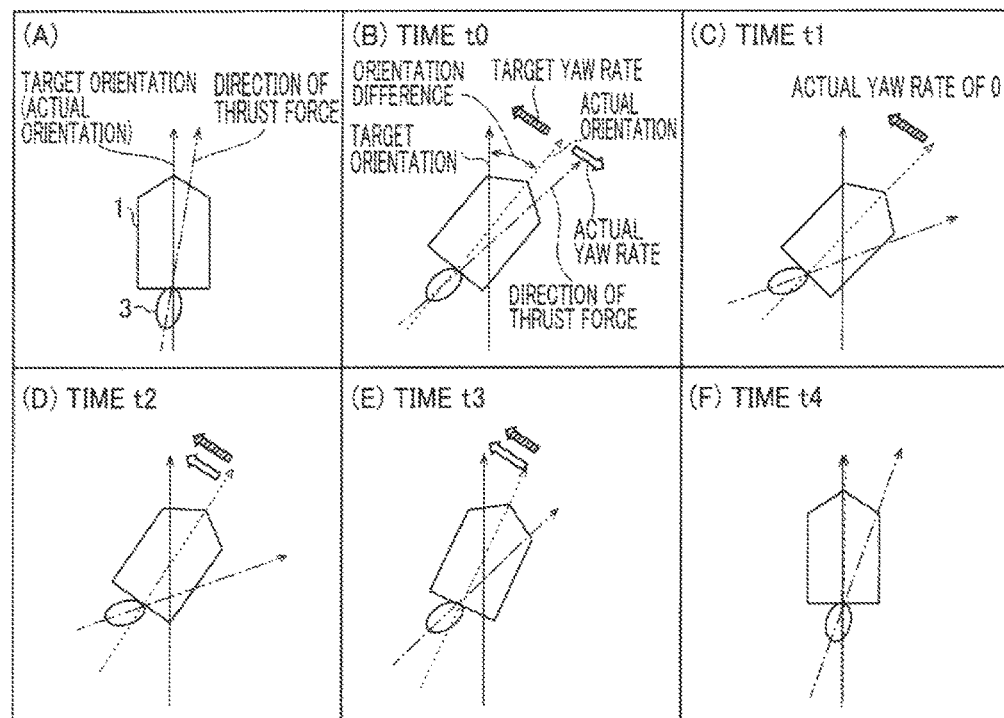
FIG. 7  CONTROL LOGIC FOR TURNING CONTROL
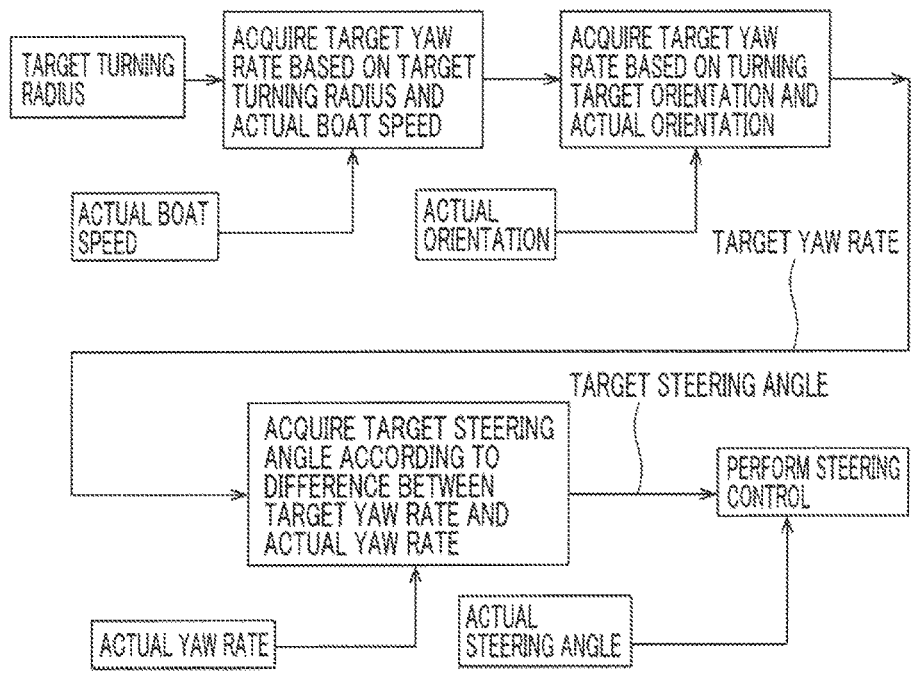

FIG.8   RELATIONSHIP BETWEEN TARGET YAW RATE AND
         ACTUAL ORIENTATION (DURING TURNING CONTROL)
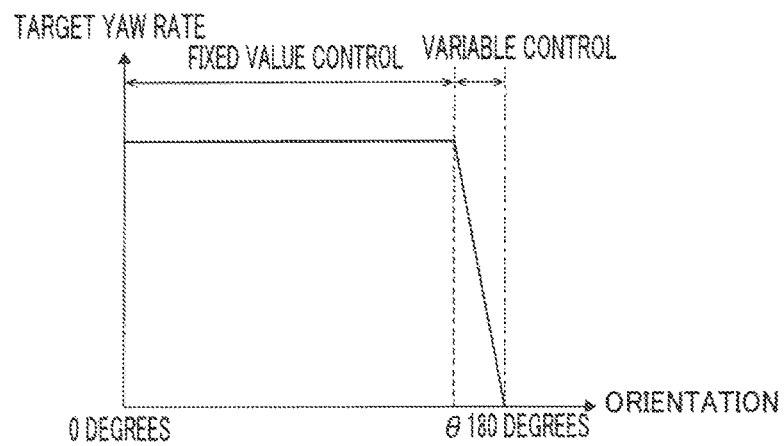
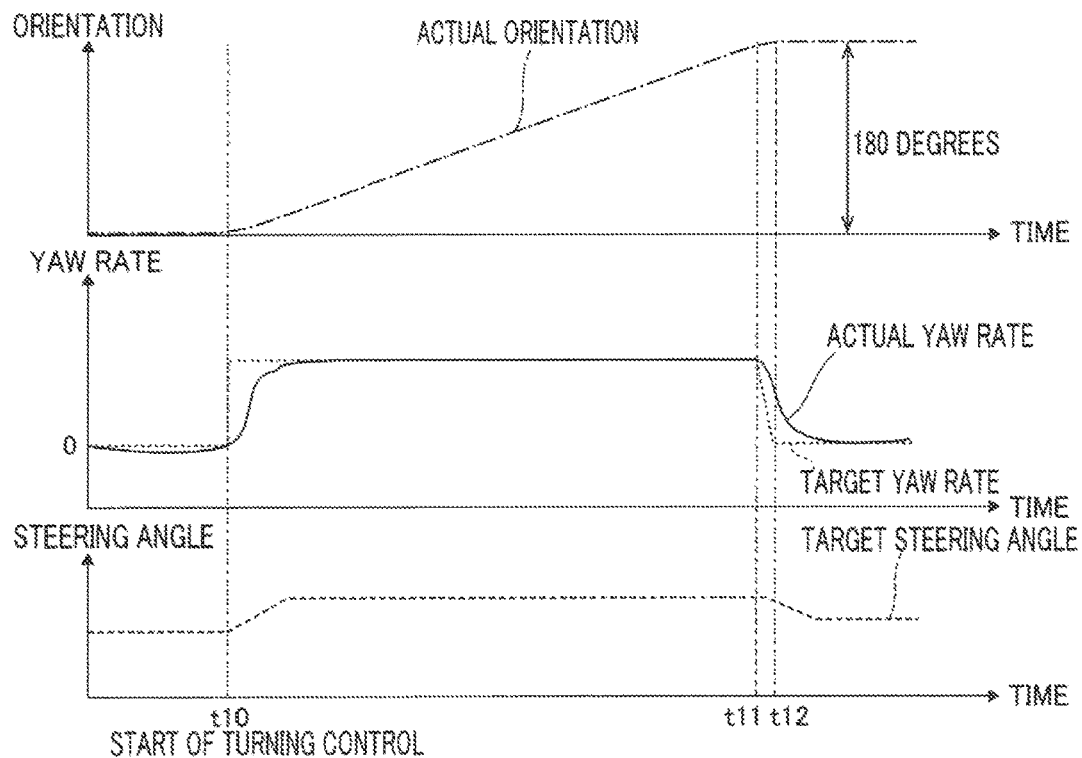
FIG.9

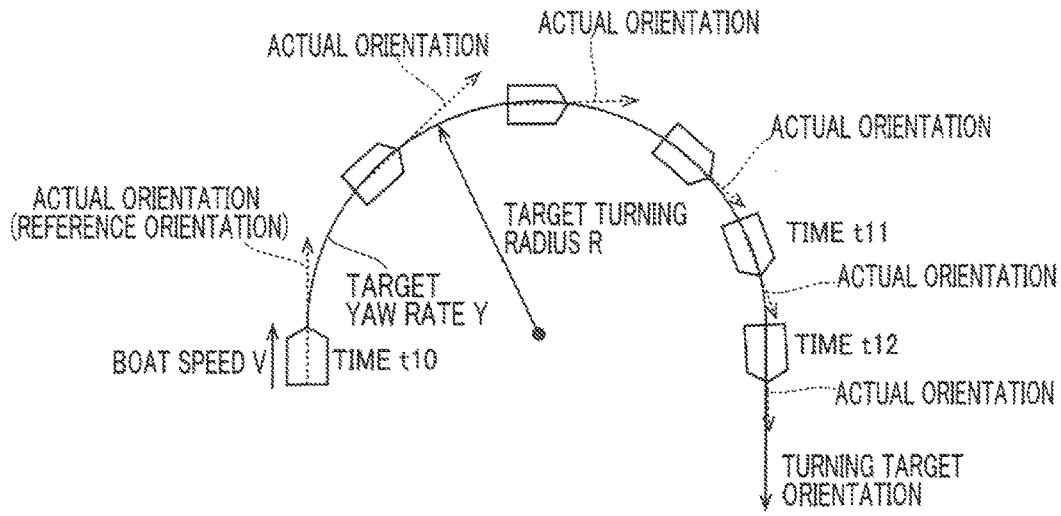
FIG.10 EXAMPLE OF OPERATION OF TURNING CONTROL (TURNING ANGLE OF 180 DEGREES)
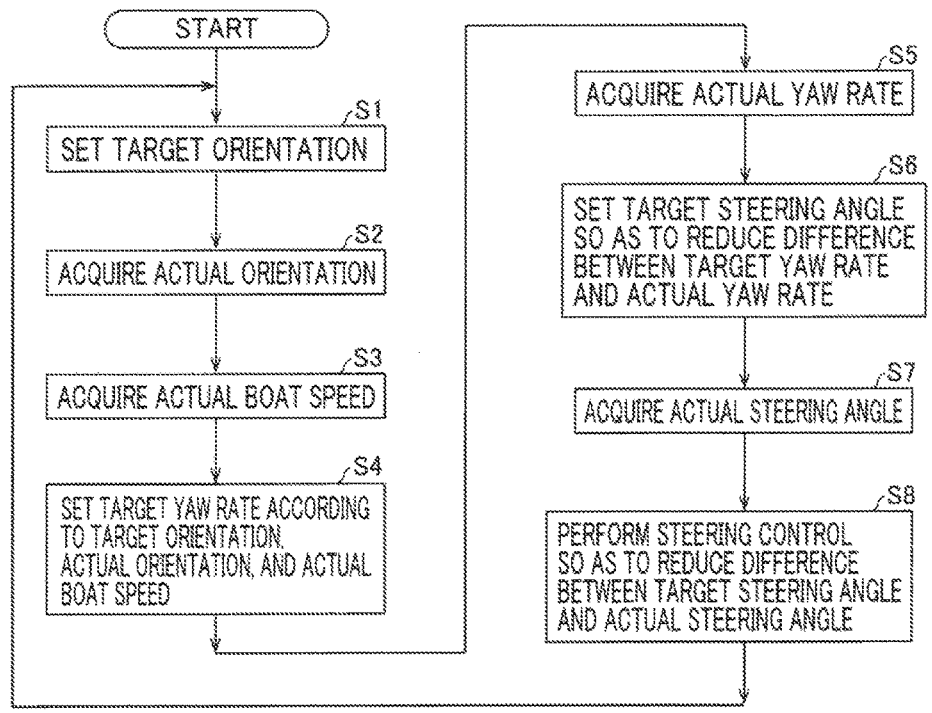
FIG.11 ORIENTATION CONTROL PROCESSING

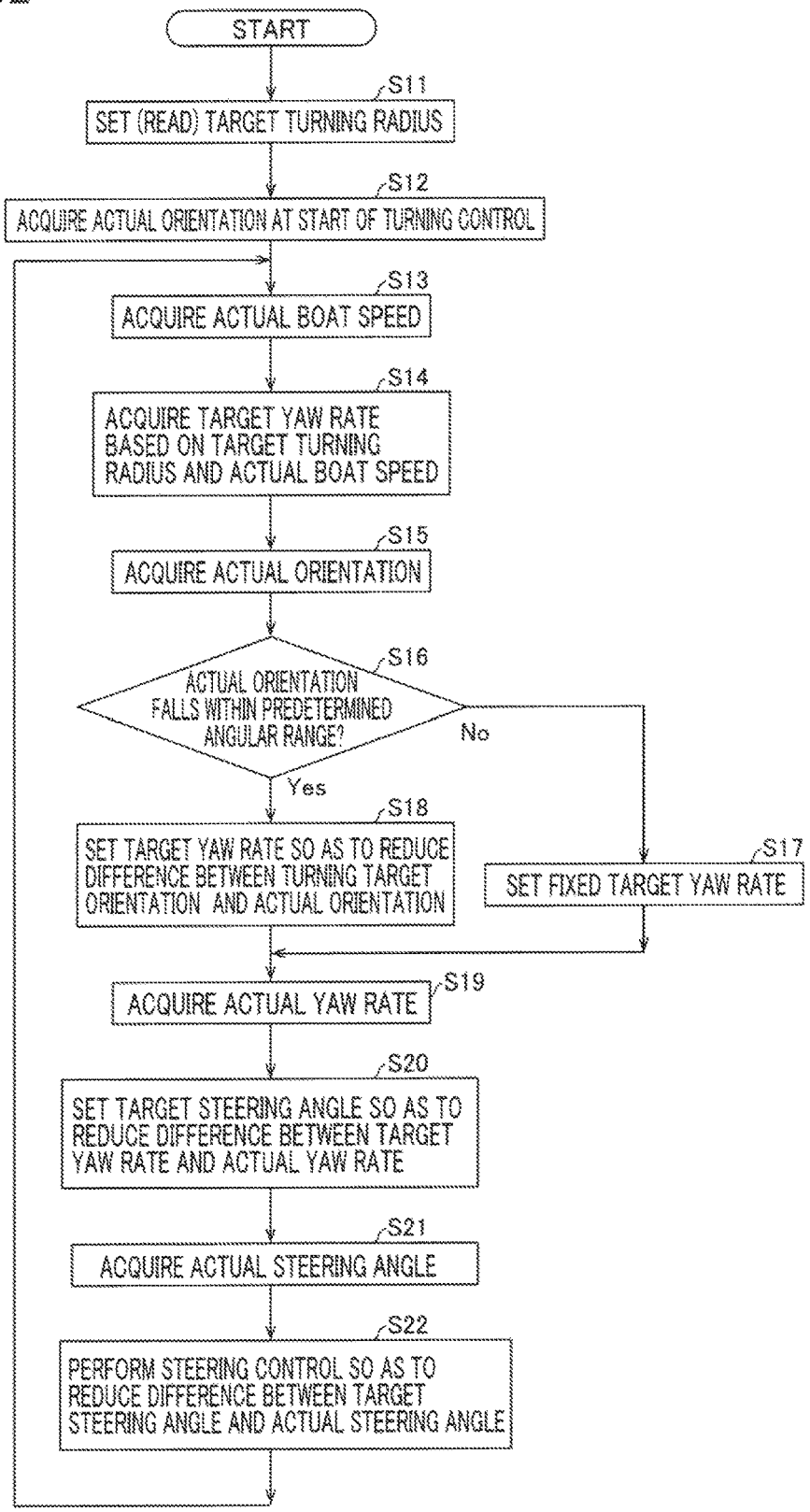

BOAT MANEUVERING CONTROL METHOD FOR BOAT AND BOAT MANEUVERING CONTROL SYSTEM FOR BOAT

CROSS-REFERENCE TO RELATED APPLICATION

This application claims priority to Patent Application No. 2015-224677 filed in Japan on Nov. 17, 2015, the entire contents of which are hereby incorporated by reference.

BACKGROUND OF THE INVENTION

1. Field of the Invention

The present invention relates to a boat maneuvering control method for a boat and a boat maneuvering control system for a boat.

2. Description of the Related Art

A boat maneuvering control method for a boat is known in general. Such a boat maneuvering control method for a boat is disclosed in Japanese Patent Laid-Open No. 2008-247102.

Japanese Patent Laid-Open No. 2008-247102 discloses a fixed point position holding method for a boat (a boat maneuvering control method for a boat) including performing bow priority control of controlling a bow orientation to a target orientation and reposition control of controlling movement in forward and backward directions or right and left directions.

Although in the fixed point position holding method for a boat described in Japanese Patent Laid-Open No. 2008-247102, the bow priority control (orientation control) is performed, the orientation of the boat is deviated due to external factors such as waves, tides, and wind, and deviation of the orientation of the boat differs from one external factor to another. In this case, although not clearly described in Japanese Patent Laid-Open No. 2008-247102, it may be difficult for the bow orientation to converge on the target orientation when the bow priority control is performed only according to a difference between the target orientation and the bow orientation, for example. Thus, it is difficult to perform stable orientation control.

SUMMARY OF THE INVENTION

Preferred embodiments of the present invention provide a boat maneuvering control method for a boat and a boat maneuvering control system for a boat that enable stable orientation control.

A boat maneuvering control method for a boat provided with a propulsion device according to a preferred embodiment of the present invention includes acquiring a target orientation, acquiring an actual orientation of the boat, setting a target yaw rate value based on orientation information of at least one of the target orientation and the actual orientation, detecting the actual yaw rate value of the boat, and controlling the direction of the thrust force of the propulsion device based on the target yaw rate value and the actual yaw rate value.

A boat maneuvering control method for a boat according to a preferred embodiment of the present invention includes controlling the direction of the thrust force of the propulsion device based on the target yaw rate value and the actual yaw rate value. Thus, when orientation control for the boat is performed, the orientation control is performed by controlling the direction of the thrust force of the propulsion device based on both the target yaw rate value (the change rate of the target orientation) and the actual yaw rate value (the change rate of the actual orientation), and hence the actual orientation of the boat promptly converges on the target orientation as compared with the case where the orientation control for the boat is performed based on only the difference between the target orientation and the actual orientation of the boat. Consequently, the stable orientation control is performed. When turning control for the boat is performed, the turning control is performed by controlling the direction of the thrust force of the propulsion device based on both the target yaw rate value and the actual yaw rate value, and hence the turning control such as turning control of turning the boat in a swirled fashion or turning control in which a target turning radius is specified is easily performed.

In a boat maneuvering control method for a boat according to a preferred embodiment of the present invention, the target yaw rate value is preferably set according to a difference between the target orientation and the actual orientation. Accordingly, the target yaw rate value is properly set according to the difference between the target orientation and the actual orientation, and hence the orientation control is properly performed.

In a boat maneuvering control method for a boat according to a preferred embodiment of the present invention, the direction of the thrust force of the propulsion device is preferably controlled according to a difference between the target yaw rate value and the actual yaw rate value. Accordingly, the orientation control is performed with high accuracy according to the difference between the target yaw rate value and the actual yaw rate value.

A boat maneuvering control method for a boat according to a preferred embodiment of the present invention preferably further includes acquiring the boat speed of the boat, and the target yaw rate value is preferably set according to the boat speed in addition to the orientation information. Accordingly, the target yaw rate value is properly set according to the boat speed of the boat, and hence the orientation control is properly performed.

In this case, the target yaw rate value is preferably set such that an absolute value of the target yaw rate value is decreased according to an increase in the boat speed. Accordingly, when the boat speed of the boat is relatively large such that the boat is likely to change its orientation, the absolute value of the target yaw rate value is set to be relatively small. When the boat speed of the boat is relatively small such that the boat is unlikely to change its orientation, the absolute value of the target yaw rate value is set to be relatively large. Consequently, the target yaw rate value is more properly set, and hence the orientation control is more properly performed.

In a method in which the target yaw rate value is set according to the difference between the target orientation and the actual orientation, the target yaw rate value is preferably set such that an absolute value of the target yaw rate value is increased according to an increase in an absolute value of the difference between the target orientation and the actual orientation. Accordingly, when the difference between the target orientation and the actual orientation is relatively large such that it is necessary to significantly change the orientation of the boat, the absolute value of the target yaw rate value is set to be relatively large. When the difference between the target orientation and the actual orientation is relatively small such that it is necessary to insignificantly change the orientation of the boat, the absolute value of the target yaw rate value is set to be relatively small. Consequently, the target yaw rate value is more properly set, and hence the orientation control is more properly performed.

In a boat maneuvering control method for a boat according to a preferred embodiment of the present invention, a limit value is preferably set for the target yaw rate value. Accordingly, the target yaw rate value is prevented from being set to be excessively large.

A boat maneuvering control method for a boat according to a preferred embodiment of the present invention preferably further includes acquiring target turning information about the boat and acquiring the boat speed of the boat, a turning target orientation is preferably acquired as the target orientation, the actual orientation of the boat during turning of the boat is preferably acquired as the actual orientation of the boat, the target yaw rate value is preferably set based on the orientation information of at least one of the turning target orientation and the actual orientation, the target turning information, and the boat speed, and turning control for the boat is preferably performed by controlling the direction of the thrust force of the propulsion device such that the actual yaw rate value approaches the target yaw rate value. Accordingly, the direction of the thrust force of the propulsion device is controlled such that the actual yaw rate value approaches the target yaw rate value set based on the orientation information of at least one of the turning target orientation and the actual orientation, the target turning information, and the boat speed, and hence the turning control such as the turning control of turning the boat in a swirled fashion or the turning control in which the target turning radius is specified is more easily performed.

In this case, the target turning radius of the boat is preferably acquired as the target turning information, the target yaw rate value is preferably set based on the target turning radius and the boat speed, and the boat is preferably turned with the target turning radius by controlling the direction of the thrust force of the propulsion device such that the actual yaw rate value approaches the target yaw rate value. Accordingly, the turning control is easily performed with the acquired target turning radius.

In the method in which the boat is turned with the target turning radius, the target yaw rate value is preferably set based on the turning target orientation and the actual orientation. Accordingly, the target yaw rate value of the boat during the turning is properly set based on the turning target orientation and the actual orientation, and hence the turning control is properly performed with the acquired target turning radius.

In this case, the target yaw rate value that is fixed is preferably set based on the target turning radius and the boat speed when the actual orientation falls outside a predetermined angular range, and the target yaw rate value is preferably set so as to reduce a difference between the turning target orientation and the actual orientation when the actual orientation falls within the predetermined angular range thereafter. Accordingly, the turning control is stably performed with the fixed target yaw rate value until the actual orientation approaches the turning target orientation. After the actual orientation approaches the turning target orientation, the actual orientation easily converges on the turning target orientation by the target yaw rate value that enables a reduction in the difference between the turning target orientation and the actual orientation.

In a method in which the turning control is performed, at least one of a control gain, a limit value of the target yaw rate value, and a limit value of a target steering angle set based on the target yaw rate value and the actual yaw rate value is preferably changed according to the boat speed. Accordingly, when the boat speed of the boat is relatively small such that the boat is unlikely to turn, for example, the control gain, the limit value of the target yaw rate value, and the limit value of the target steering angle are increased. When the boat speed of the boat is relatively large such that the boat is likely to turn, for example, the control gain, the limit value of the target yaw rate value, and the limit value of the target steering angle are decreased. Consequently, the turning control according to the boat speed is easily performed.

In this case, the control gain, the limit value of the target yaw rate value, and the limit value of the target steering angle according to the boat speed are preferably determined based on the magnitude of centrifugal force based on the boat speed and the target turning information. Accordingly, the control gain, the limit value of the target yaw rate value, and the limit value of the target steering angle are determined based on the magnitude of the centrifugal force, and hence an excessive increase in the centrifugal force during the turning of the boat is significantly reduced or prevented.

In a boat maneuvering control method for a boat according to a preferred embodiment of the present invention, in addition to the direction of the thrust force of the propulsion device, the magnitude of the thrust force of the propulsion device is preferably controlled based on the target yaw rate value and the actual yaw rate value. Accordingly, in addition to the direction of the thrust force of the propulsion device, the magnitude of the thrust force is controlled such that the orientation control and the turning control are more easily performed.

In the boat maneuvering control method for a boat according to a preferred embodiment of the present invention, the direction of the thrust force of the propulsion device is preferably controlled by controlling the steering angle of the propulsion device. Accordingly, the direction of the thrust force of the propulsion device is easily changed.

A boat maneuvering control system for a boat according to a preferred embodiment of the present invention includes a propulsion device, a selector that acquires a target orientation, acquires the actual orientation of the boat, and sets a target yaw rate value based on orientation information of at least one of the target orientation and the actual orientation, a yaw rate detector that detects the actual yaw rate value of the boat, and a controller configured or programmed to control the direction of the thrust force of the propulsion device based on the target yaw rate value and the actual yaw rate value.

A boat maneuvering control system for a boat according to a preferred embodiment of the present invention is provided with the controller configured or programmed to control the direction of the thrust force of the propulsion device based on the target yaw rate value and the actual yaw rate value. Thus, similarly to the case of the boat maneuvering control method for a boat according to the above preferred embodiment of the present invention, stable orientation control is performed, and turning control such as turning control of turning the boat in a swirled fashion or turning control in which a target turning radius is specified is easily performed.

In the boat maneuvering control system for a boat according to a preferred embodiment of the present invention, the selector preferably sets the target yaw rate value based on a difference between the target orientation and the actual orientation. Accordingly, the actual orientation of the boat easily converges on the target orientation.

In a boat maneuvering control system for a boat according to a preferred embodiment of the present invention, the selector preferably acquires a turning target orientation as the target orientation, acquires the actual orientation of the boat during turning of the boat as the actual orientation of the boat, acquires target turning information about the boat, acquires the boat speed of the boat, and sets the target yaw rate value based on the orientation information of at least one of the turning target orientation and the actual orientation, the target turning information, and the boat speed, and the controller is preferably configured or programmed to perform turning control for the boat by controlling the direction of the thrust force of the propulsion device such that the actual yaw rate value approaches the target yaw rate value. Accordingly, the controller is configured or programmed to control the direction of the thrust force of the propulsion device such that the actual yaw rate value approaches the target yaw rate value set based on the target turning information and the boat speed, and hence the controller more easily performs the turning control such as the turning control of turning the boat in a swirled fashion or the turning control in which the target turning radius is specified.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 illustrates a relationship between a difference between a target orientation and an actual orientation and a target yaw rate value in the orientation control performed by the boat maneuvering control system for a boat according to a preferred embodiment of the present invention.

FIG. 5 illustrates a relationship between the target yaw rate value, an actual yaw rate value, a target steering angle, and time in the orientation control performed by the boat maneuvering control system for a boat according to a preferred embodiment of the present invention.

FIG. 6 illustrates an example of the operation of the orientation control in the boat maneuvering control system for a boat according to a preferred embodiment of the present invention.

FIG. 7 illustrates control logic for turning control in the boat maneuvering control system for a boat according to a preferred embodiment of the present invention.

FIG. 8 illustrates a relationship between the target yaw rate value and the actual orientation in the turning control performed by the boat maneuvering control system for a boat according to a preferred embodiment of the present invention.

FIG. 9 illustrates a relationship between the actual orientation, the target yaw rate value, the actual yaw rate value, the target steering angle, and time in the turning control performed by the boat maneuvering control system for a boat according to a preferred embodiment of the present invention.

FIG. 10 illustrates an example of the operation of the turning control in the boat maneuvering control system for a boat according to a preferred embodiment of the present invention.

FIG. 11 is a flowchart for illustrating orientation control processing in the boat maneuvering control system for a boat according to a preferred embodiment of the present invention.

FIG. 12 is a flowchart for illustrating turning control processing in the boat maneuvering control system for a boat according to a preferred embodiment of the present invention.

DETAILED DESCRIPTION OF THE PREFERRED EMBODIMENTS

Preferred embodiments of the present invention are hereinafter described with reference to the drawings.

The structure of a boat 1 including a boat maneuvering control system 100 for a boat according to preferred embodiments of the present invention is now described with reference to FIGS. 1 and 2. In the figures, arrow FWD represents the forward movement direction of the boat 1, and arrow BWD represents the backward movement direction of the boat 1. In the figures, arrow R represents the starboard direction of the boat 1, and arrow L represents the portside direction of the boat 1.

Figure 1:
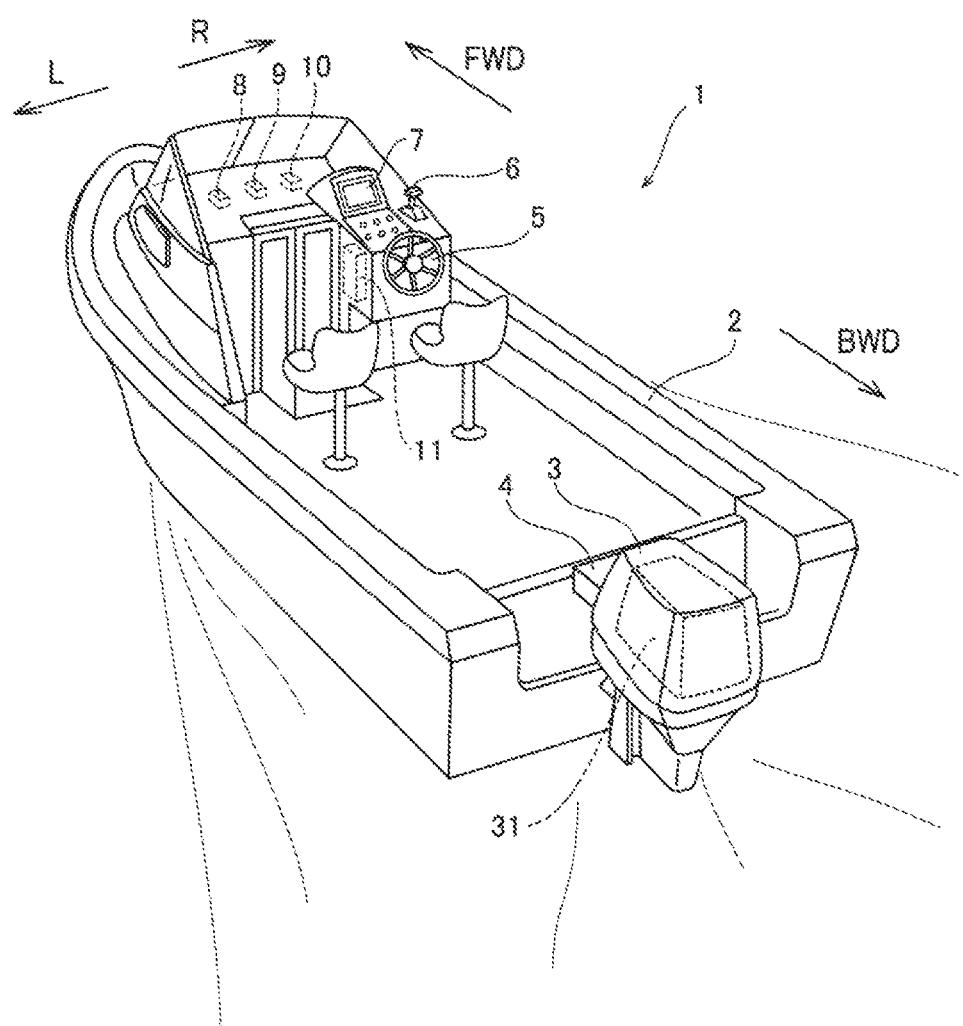
FIG. 1 is a diagram showing a boat including a boat maneuvering control system for a boat according to a preferred embodiment of the present invention.
Figure 2:
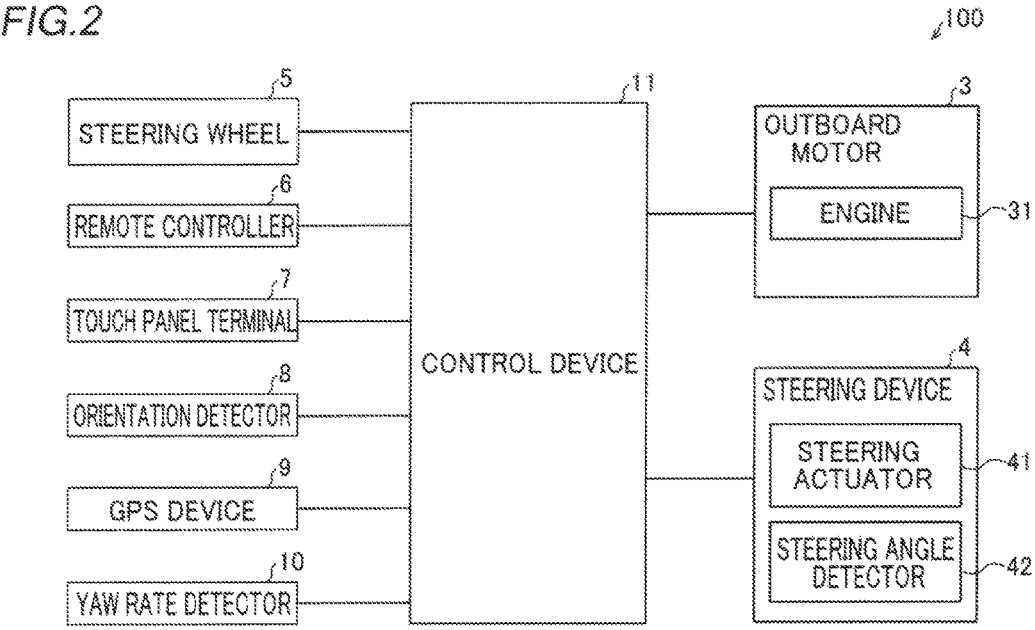
FIG. 2 is a block diagram schematically showing the boat maneuvering control system for a boat according to a preferred embodiment of the present invention.

The boat 1 includes a boat body 2, a single outboard motor 3, a single steering device 4, a steering wheel 5, a remote control 6, a touch panel terminal 7, an orientation detector 8, a GPS (global positioning system) device 9, a yaw rate detector 10, and a controller 11, as shown in FIGS. 1 and 2. The outboard motor 3 is an example of a "propulsion device". The controller 11 is an example of a "selector" or a "controller".

The outboard motor 3 is a propulsion device that provides thrust force to the boat body 2. The outboard motor 3 is mounted on a rear portion of the boat body 2. The outboard motor 3 includes an engine 31 as a power source that provides thrust force to the boat body 2. The outboard motor 3 includes a drive shaft (not shown) arranged to extend to below the engine 31, one propeller shaft (not shown) that extends in a direction orthogonal to (intersecting with) the drive shaft, and one propeller (not shown) mounted on a rear end portion of the propeller shaft, rotated together with the propeller shaft. In the outboard motor 3, drive force generated by the engine 31 is transmitted to the propeller through the drive shaft and the propeller shaft. Thus, the propeller is rotated such that the outboard motor 3 provides thrust force to the boat body 2.

The steering device 4 steers the outboard motor 3. The steering device 4 is mounted on a position corresponding to the mounting position of the outboard motor 3 in the rear portion of the boat body 2. The steering device 4 includes a steering actuator 41 as a power source that rotates (steers) the outboard motor 3 in right and left directions and a steering angle detector 42 that detects the steering angle (rotation angle) of the outboard motor 3. The steering angle (rotation angle) is an angle defined by the front to back direction of the boat 1 and the direction of the thrust force of the outboard motor 3.

The steering actuator 41 rotates the outboard motor 3 in the right and left directions about a rotation axis based on control of the controller 11. Thus, the steering angle of the outboard motor 3 is changed, and the direction of the thrust force of the outboard motor 3 is controlled such that the orientation of the boat 1 is changed. The steering angle detected by the steering angle detector 42 is acquired by the controller 11.

The steering wheel 5 steers the boat body 2. The steering wheel 5 is connected to the steering device 4 through the controller 11. The steering device 4 steers the outboard motor 3 based on the operation of the steering wheel 5 such that the boat body 2 is steered.

The remote control 6 manipulates the shift and output (throttle position) of the outboard motor 3. The remote control 6 is connected to the outboard motor 3 through the controller 11. The output and shift (forward movement, reverse movement, or neutral) of the outboard motor 3 are controlled based on the operation of the remote control 6.

The touch panel terminal 7 is used to manipulate movement of the boat body 2 and to select and switch a mode of the operating state of the boat 1. Specifically, the touch panel terminal 7 controls the outboard motor 3 to manipulate movement of the boat 1. The touch panel terminal 7 is portable, and a user maneuvers the boat 1 in an arbitrary location on the boat 1 with the touch panel terminal 7 in his/her hand. The touch panel terminal 7 is a tablet terminal, for example.

The touch panel terminal 7 displays information about the boat 1. The touch panel terminal 7 displays information such as the boat speed of the boat 1, the rotational speed of the engine 31, the remaining amount and consumed amount of fuel (e.g., gasoline), the fuel efficiency, the temperature of the engine 31, the capacity of a battery, the mode of the operating state, etc., for example. The touch panel terminal 7 receives selection of the mode of the operating state by the user. The mode of the operating state includes an auto cruise mode of automatically maneuvering the boat 1, a mode of docking the boat 1 and moving the boat 1 away from the shore when docking the boat 1 and moving the boat 1 away from the shore, a trolling mode of moving the boat 1 at low speed, and a towing mode of towing water skis, a wakeboard, or the like. The touch panel terminal 7 is in wired or wireless communication with the controller 11.

The orientation detector 8 detects the direction of a bow of the boat 1. The direction of the bow of the boat 1 detected by the orientation detector 8 is acquired as the actual orientation of the boat 1 by the controller 11. The orientation detector 8 is an electronic compass, for example.

The GPS device 9 detects the position and speed (boat speed) of the boat 1. The position and boat speed of the boat 1 detected by the GPS device 9 are acquired by the controller 11.

The yaw rate detector 10 detects the yaw rate (the change rate of the steering angle) of the boat 1. The yaw rate of the boat 1 detected by the yaw rate detector 10 is acquired as the actual yaw rate value of the boat 1 by the controller 11. The yaw rate detector 10 is a gyro sensor, for example.

The controller 11 controls the outboard motor 3, the steering device 4, etc. based on information from the outboard motor 3, the steering device 4, the steering wheel 5, the remote control 6, the touch panel terminal 7, the orientation detector 8, the GPS device 9, the yaw rate detector 10, etc.

The boat maneuvering control system 100 for a boat includes the outboard motor 3, the steering device 4, the steering wheel 5, the remote control 6, the touch panel terminal 7, the orientation detector 8, the GPS device 9, the yaw rate detector 10, and the controller 11, as shown in FIG. 2.

According to a preferred embodiment of the present invention, the controller 11 acquires a target orientation, acquires the actual orientation of the boat 1, and sets a target yaw rate value based on the target orientation and the actual orientation. The controller 11 controls the direction of the thrust force of the outboard motor 3 based on the set target yaw rate value and the actual yaw rate value detected by the yaw rate detector 10 so as to perform orientation control for the boat 1 or turning control for the boat 1. At this time, the controller 11 controls the steering angle of the outboard motor 3 by the steering device 4 so as to control the direction of the thrust force of the outboard motor 3.

The orientation control is now described with reference to FIGS. 3 to 6. In the orientation control, the controller 11 controls the direction of the thrust force of the outboard motor 3 based on the target yaw rate value and the actual yaw rate value so as to reduce a difference between a target orientation and the actual orientation (such that the actual orientation approaches the target orientation). Thus, the actual orientation of the boat 1 substantially converges on the target orientation. Consequently, the actual orientation of the boat 1 (the direction of the bow) is held to the target orientation.

Figure 3:
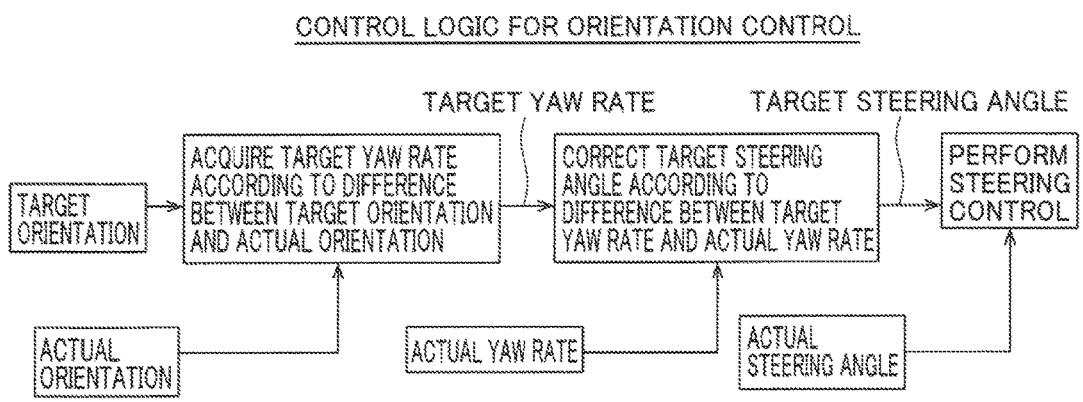
FIG. 3 illustrates control logic for orientation control in the boat maneuvering control system for a boat according to a preferred embodiment of the present invention.

As shown in FIG. 3, the controller 11 first acquires the target orientation. When the user gives an instruction to start the orientation control through the touch panel terminal 7, for example, the controller 11 acquires the orientation of the boat 1 detected by the orientation detector 8 at this time as the target orientation. When the user gives an instruction to change the target orientation by a predetermined angle through the touch panel terminal 7 during the orientation control, for example, the controller 11 reacquires the changed target orientation as a new target orientation.

The controller 11 acquires the direction of the bow of the boat 1 detected by the orientation detector 8 during the orientation control as the actual orientation. The controller 11 acquires and sets the target yaw rate value according to a difference between the acquired target orientation and the actual orientation, as shown in FIG. 4.

Specifically, the controller 11 acquires and sets nearly zero as the target yaw rate value when an absolute value of the difference between the target orientation and the actual orientation is in a numerical range of at least zero and not more than a first threshold Th1 (Th1>0). The controller 11 acquires and sets the target yaw rate value such that an absolute value of the target yaw rate value is increased according to an increase in the absolute value of the difference between the target orientation and the actual orientation when the absolute value of the difference between the target orientation and the actual orientation is in a numerical range of more than the first threshold and not more than a second threshold Th2 (Th2>Th1). The controller 11 acquires and sets predetermined limit values as the target yaw rate value when the absolute value of the difference between the target orientation and the actual orientation is more than the second threshold Th2. More specifically, the limit values are set for the target yaw rate value.

As shown in FIG. 2, the controller 11 acquires the actual boat speed of the boat 1 detected by the GPS device 9. The controller 11 acquires and sets the target yaw rate value according to the actual boat speed in addition to the difference between the target orientation and the actual orientation, as shown in FIG. 4.

Specifically, the controller 11 acquires and sets the target yaw rate value such that the absolute value of the target yaw rate value is decreased according to an increase in the actual boat speed. As shown in FIG. 4, the controller 11 acquires the target yaw rate value, the absolute value of which is smaller, as compared with the case where the actual boat speed is relatively small when the actual boat speed is relatively large. At this time, absolute values of the limit values of the target yaw rate value are also decreased according to an increase in the actual boat speed.

As shown in FIG. 3, the controller 11 acquires the actual yaw rate value detected by the yaw rate detector 10. The controller 11 corrects and sets a target steering angle according to a difference between the target yaw rate value and the actual yaw rate value so as to reduce the difference between the target yaw rate value and the actual yaw rate value (such that the actual yaw rate value approaches the target yaw rate value). At this time, the controller 11 corrects and sets the target steering angle such that an absolute value of a correction value for the target steering angle is increased according to an increase in an absolute value of the difference between the target yaw rate value and the actual yaw rate value. The controller 11 corrects and sets the target steering angle such that the absolute value of the correction value for the target steering angle is decreased according to an increase in the actual boat speed, similarly to the case of the target yaw rate value.

Limit values are set for the target steering angle, similarly to the case of the target yaw rate value.

The controller 11 acquires the actual steering angle of the outboard motor 3 detected by the steering angle detector 42 of the steering device 4. The controller 11 controls the steering angle of the outboard motor 3 (performs steering control) by the steering device 4 according to a difference between the target steering angle and the actual steering angle so as to reduce the difference between the target steering angle and the actual steering angle (such that the actual steering angle approaches the target steering angle). Thus, the controller 11 controls the steering angle of the outboard motor 3 and controls the direction of the thrust force of the outboard motor 3 so as to perform the orientation control for the boat 1.

FIG. 5 shows an example of a relationship between the target yaw rate value, the actual yaw rate value, the target steering angle, and time in the orientation control. FIG. 6 shows an example of the operation of the orientation control in the example shown in FIG. 5. View (B) to view (F) of FIG. 6 shows the state of the boat 1 at times t0 to t4 shown in FIG. 5, respectively.

Assume that a state where the actual orientation of the boat 1 substantially converges on the target orientation, as shown in view (A) of FIG. 6 is changed to a state where the actual orientation of the boat 1 is deviated clockwise by a predetermined orientation difference from the target orientation due to influences of wind, tides, waves, etc., as shown in view (B) of FIG. 6. Furthermore, assume that a clockwise yaw rate is generated in the boat 1 at the time to.

In this case, the actual orientation deviated clockwise by the predetermined orientation difference from the target orientation is detected at the time t0, as shown in each of FIG. 5 and view (B) of FIG. 6. Then, the target yaw rate value is set according to a difference (orientation difference) between the detected actual orientation and the target orientation. Specifically, a counterclockwise target yaw rate value is set so as to reduce the difference between the target orientation and the actual orientation.

At the time t0, a clockwise actual yaw rate value is detected. The target steering angle is corrected and set according to a difference between the detected actual yaw rate value and the target yaw rate value so as to reduce the difference between the target yaw rate value and the actual yaw rate value. Specifically, the target steering angle is corrected and set so as to be increased such that thrust force to turn the bow of the boat 1 counterclockwise is increased. At this time, the target steering angle is corrected and set by a correction value of magnitude according to the difference between the target yaw rate value and the actual yaw rate value. As shown in FIG. 5, the difference between the target yaw rate value and the actual yaw rate value is relatively large at the time t0, and hence the target steering angle is corrected and set by the relatively large correction value. Then, the steering control is performed according to the difference between the target steering angle and the actual steering angle so as to reduce the difference between the target steering angle and the actual steering angle. As shown in FIG. 5, the steering control is performed every predetermined period.

Then, the actual yaw rate value reaches zero at the time t1 by reducing the difference between the target yaw rate value and the actual yaw rate value, as shown in FIG. 5 and view (C) of FIG. 6. In other words, neither a clockwise nor counterclockwise yaw rate is generated in the boat 1 at the time t1. A clockwise yaw rate is generated in the boat 1 during a period from the time t0 to the time t1, and hence the difference between the actual orientation and the target orientation is increased. Thus, the target yaw rate value according to the difference between the actual orientation and the target orientation is also set so as to be increased during the period from the time t0 to the time t1. After the time t1, the difference between the target yaw rate value and the actual yaw rate value is further reduced such that a counterclockwise yaw rate is generated in the boat 1.

Then, a counterclockwise yaw rate is generated in the boat 1 at the time t2, as shown in FIG. 5 and view (D) of FIG. 6, and hence the difference between the actual orientation and the target orientation is reduced. Thus, a counterclockwise target yaw rate value is set to be smaller than the last target yaw rate value at the time t2.

Then, a counterclockwise actual yaw rate value is detected at the time t2. Then, the target steering angle is corrected and set according to the difference between the detected actual yaw rate value and the target yaw rate value so as to reduce the difference between the target yaw rate value and the actual yaw rate value. Specifically, the target steering angle is corrected and set so as to be increased such that thrust force to turn the bow of the boat 1 counterclockwise is increased. At this time, the target steering angle is corrected and set by the correction value of the magnitude according to the difference between the target yaw rate value and the actual yaw rate value. As shown in FIG. 5, the difference between the target yaw rate value and the actual yaw rate value is smaller at the time t2 than at the time t0, and hence the target steering angle is corrected and set by the correction value smaller than that at the time t0. Then, the steering control is performed according to the difference between the target steering angle and the actual steering angle so as to reduce the difference between the target steering angle and the actual steering angle.

Then, a counterclockwise yaw rate is generated in the boat 1 at the time t3, as shown in FIG. 5 and view (E) of FIG. 6, and hence the difference between the actual orientation and the target orientation is reduced. Thus, a counterclockwise target yaw rate value is set to be smaller than the last target yaw rate value at the time t3.

Furthermore, a counterclockwise actual yaw rate value is detected at the time t3. Then, the target steering angle is corrected and set according to the difference between the detected actual yaw rate value and the target yaw rate value so as to reduce the difference between the target yaw rate value and the actual yaw rate value. At the time t3, the actual yaw rate value is larger than the target yaw rate value, and hence the target steering angle is corrected and set so as to be decreased such that thrust force for turning the bow of the boat 1 counterclockwise is decreased. At this time, the target steering angle is corrected and set by the correction value of the magnitude according to the difference between the target yaw rate value and the actual yaw rate value. Then, the steering control is performed according to the difference between the target steering angle and the actual steering angle so as to reduce the difference between the target steering angle and the actual steering angle.

Then, at the time t4, the actual yaw rate value substantially converges on the target yaw rate value, and the actual orientation substantially converges on the target orientation, as shown in FIG. 5 and view (F) of FIG. 6. After the actual orientation substantially converges on the target orientation, similar control is performed every predetermined period. In an example shown in view (F) of FIG. 6, the actual steering angle is not neutral (zero) due to influences of wind, tides, waves, etc. at the time t4 even if the target yaw rate value is zero. In the example shown in FIG. 5, the absolute value of the difference between the target orientation and the actual orientation falls within the numerical range of at least zero and not more than the first threshold Th1 after the time t4, and hence the target yaw rate value is unchanged. In this manner, the orientation control for the boat 1 is performed.

The turning control is now described with reference to FIGS. 7 to 10. According to a preferred embodiment of the present invention, the turning control in which a target turning radius is specified is performed. The controller 11 controls the direction of the thrust force of the outboard motor 3 such that the actual yaw rate value approaches the target yaw rate value so as to perform the turning control for the boat 1.

As shown in FIG. 7, the controller 11 first acquires the target turning radius of the boat 1 as target turning information about the boat 1. When the user specifies the target turning radius through the touch panel terminal 7, for example, the controller 11 acquires the specified target turning radius.

The controller 11 acquires the actual boat speed of the boat 1 detected by the GPS device 9. The controller 11 acquires the target yaw rate value based on the target turning radius and the actual boat speed. Specifically, setting the target turning radius as R, the actual boat speed as V, and the target yaw rate value as Y, the controller 11 acquires the target yaw rate value by the following formula (1).

$$Y = V/R \quad (1)$$

The controller 11 acquires a target orientation during the turning control (hereinafter referred to as the "turning target orientation"). In the case where the boat 1 turns by 180 degrees (makes a U-turn), for example, the controller 11 first acquires, as a reference orientation, the orientation of the boat 1 detected by the orientation detector 8 when the user gives an instruction to start the turning control through the touch panel terminal 7. Then, the controller 11 acquires an orientation deviated by 180 degrees from the reference orientation as the turning target orientation. Although an example in the case where the boat 1 turns by 180 degrees (makes a U-turn) is described below, an angle by which the boat 1 turns (turning angle) is not limited to 180 degrees. An arbitrary angle, which is larger than 0 degrees and smaller than 360 degrees, may be used.

The controller 11 acquires the actual orientation of the boat 1 detected by the orientation detector 8 during the turning of the boat 1. The controller 11 acquires and sets the target yaw rate value based on the turning target orientation and the actual orientation, as shown in FIG. 8.

Specifically, the controller 11 performs fixed value control of fixing the target yaw rate value when the actual orientation falls outside a predetermined angular range (the actual orientation falls within an angular range from 0 degrees (reference orientation) to θ degrees). In this case, the controller 11 acquires and sets the fixed target yaw rate value ("Y" in the formula (1)) based on the target turning radius and the actual boat speed.

When the actual orientation falls within the predetermined angular range (the actual orientation falls within an angular range from θ degrees to 180 degrees), on the other hand, the controller 11 performs variable control of allowing the target yaw rate value to be variable. In this case, the controller 11 acquires and sets the target yaw rate value so as to reduce a difference between the turning target orientation and the actual orientation. More specifically, the controller 11 acquires and sets the target yaw rate value, similarly to the case of the orientation control.

As shown in FIG. 7, the controller 11 acquires the actual yaw rate value detected by the yaw rate detector 10. The controller 11 corrects and sets the target steering angle according to the difference between the target yaw rate value and the actual yaw rate value so as to reduce the difference between the target yaw rate value and the actual yaw rate value.

The controller 11 acquires the actual steering angle of the outboard motor 3 detected by the steering angle detector 42 of the steering device 4. The controller 11 controls the steering angle of the outboard motor 3 (performs the steering control) by the steering device 4 according to the difference between the target steering angle and the actual steering angle so as to reduce the difference between the target steering angle and the actual steering angle. Thus, the controller 11 controls the steering angle of the outboard motor 3 and controls the direction of the thrust force of the outboard motor 3 so as to perform the turning control for the boat 1. More specifically, the controller 11 controls the direction of the thrust force of the outboard motor 3 such that the actual yaw rate value approaches the target yaw rate value so as to turn the boat 1 with the specified target turning radius.

Limit values are set for the respective target yaw rate value and target steering angle also in the turning control, similarly to the case of the orientation control.

The controller 11 changes a control gain (a control gain used to calculate the target yaw rate value or the target steering angle), the limit values of the target yaw rate value, and the limit values of the target steering angle according to the actual boat speed.

Specifically, the controller 11 decreases each of a value of the control gain, the limit values of the target yaw rate value, and the limit values of the target steering angle according to an increase in the actual boat speed.

According to a preferred embodiment of the present invention, the control gain, the limit values of the target yaw rate value, and the limit values of the target steering angle according to the boat speed are determined based on the magnitude of centrifugal force based on the actual boat speed and the target turning radius (target turning information). Specifically, the control gain, the limit values of the target yaw rate value, and the limit values of the target steering angle according to the boat speed are determined such that the upper limit of the centrifugal force during the turning of the boat 1 is constant or substantially constant regardless of the actual boat speed of the boat 1.

FIG. 9 shows an example of a relationship between the actual orientation, the target yaw rate value, the actual yaw rate value, the target steering angle, and time in the turning control. FIG. 10 shows an example of the operation of the turning control in the example shown in FIG. 9.

As shown in FIGS. 9 and 10, the turning control is started at a time t10. At the time t10, the actual orientation is acquired as the reference orientation, and the turning target orientation is acquired based on the reference orientation. Then, the target yaw rate value ("Y" in the formula (1)) is acquired and set based on the target turning radius ("R" in the formula (1)) specified by the user and the actual boat speed ("V" in the formula (1)) at the time t10.

As shown in FIGS. 9 and 10, the actual orientation falls outside the predetermined angular range during a period from the time t10 to a time t11, and hence the fixed target yaw rate value is acquired and set. Then, the target steering angle is corrected and set according to a difference between the fixed target yaw rate value and the actual yaw rate value so as to reduce the difference between the target yaw rate value and the actual yaw rate value. Then, the steering control is performed according to the difference between the target steering angle and the actual steering angle so as to reduce the difference between the target steering angle and the actual steering angle. Thus, the boat 1 is turned at the constant or substantially constant actual yaw rate value during the period from the time t10 to the time t11.

As shown in FIGS. 9 and 10, the actual orientation falls within the predetermined angular range during a period from the time t11 to a time t12, and hence the target yaw rate value is acquired and set so as to reduce the difference between the turning target orientation and the actual orientation. Then, the target steering angle is corrected and set according to a difference between the variable target yaw rate value and the actual yaw rate value so as to reduce the difference between the target yaw rate value and the actual yaw rate value. Then, the steering control is performed according to the difference between the target steering angle and the actual steering angle so as to reduce the difference between the target steering angle and the actual steering angle. Thus, the actual orientation of the boat 1 converges to the turning target orientation during the period from the time t11 to the time t12. After the time t12, the actual orientation of the boat 1 substantially converges on the turning target orientation. Also in the turning control, the target yaw rate value (excluding the case of the fixed value) and the target steering angle are changed every predetermined period, but FIG. 9 is illustrated in a simplified manner.

Orientation control processing performed by the boat maneuvering control system 100 of the boat 1 according to the preferred embodiments of the present invention is now described with reference to a flowchart in FIG. 11. The orientation control processing is performed by the controller 11.

When the user gives an instruction to start the orientation control, the controller 11 first acquires and sets the target orientation in step S1, as shown in FIG. 11.

In step S2, the controller 11 acquires the actual orientation detected by the orientation detector 8.

In step S3, the controller 11 acquires the actual boat speed detected by the GPS device 9.

In step S4, the controller 11 acquires and sets the target yaw rate value shown in FIG. 4 according to both the difference between the target orientation and the actual orientation and the actual boat speed.

In step S5, the controller 11 acquires the actual yaw rate value detected by the yaw rate detector 10.

In step S6, the controller 11 corrects and sets the target steering angle so as to reduce the difference between the target yaw rate value set in step S4 and the actual yaw rate value acquired in step S5.

In step S7, the controller 11 acquires the actual steering angle detected by the steering angle detector 42 of the steering device 4.

In step S8, the controller 11 performs the steering control so as to reduce the difference between the target steering angle and the actual steering angle. More specifically, the controller 11 changes the steering angle of the outboard motor 3 by the steering actuator 41 of the steering device 4 so as to reduce the difference between the target steering angle and the actual steering angle. Thus, the direction of the thrust force of the outboard motor 3 is changed such that control of holding the orientation is performed. Then, the controller 11 returns to step S1.

Turning control processing performed by the boat maneuvering control system 100 of the boat 1 according to the preferred embodiments of the present invention is now described with reference to a flowchart in FIG. 12. The turning control processing is performed by the controller 11.

When the user gives an instruction to start the turning control in which the target turning radius is specified, the controller 11 first reads (acquires) and sets the specified target turning radius in step S11, as shown in FIG. 12.

In step S12, the controller 11 acquires, as the reference orientation, the actual orientation detected by the orientation detector 8 at the start of the turning control.

In step S13, the controller 11 acquires the actual boat speed detected by the GPS device 9.

In step S14, the controller 11 acquires (calculates) the target yaw rate value by the above formula (1) based on the target turning radius acquired in step S11 and the actual boat speed acquired in step S13.

In step S15, the controller 11 acquires the actual orientation detected by the orientation detector 8.

In step S16, the controller 11 determines whether or not the actual orientation falls within the predetermined angular range. When determining that the actual orientation falls outside the predetermined angular range, the controller 11 advances to step S17. When determining that the actual orientation falls within the predetermined angular range, the controller 11 advances to step S18.

In step S17, the controller 11 sets the fixed target yaw rate value acquired in step S14. More specifically, the controller 11 performs the fixed value control (see FIG. 8) of fixing the target yaw rate value when going through step S17.

In step S18, on the other hand, the controller 11 acquires and sets the target yaw rate value so as to reduce the difference between the turning target orientation and the actual orientation. More specifically, the controller 11 performs the variable control (see FIG. 8) of allowing the target yaw rate value to be variable when going through step S18.

In step S19, the controller 11 acquires the actual yaw rate value detected by the yaw rate detector 10.

In step S20, the controller 11 corrects and sets the target steering angle so as to reduce the difference between the target yaw rate value and the actual yaw rate value.

In step S21, the controller 11 acquires the actual steering angle detected by the steering angle detector 42 of the steering device 4.

In step S22, the controller 11 performs the steering control so as to reduce the difference between the target steering angle and the actual steering angle. More specifically, the controller 11 changes the steering angle of the outboard motor 3 by the steering actuator 41 of the steering device 4 so as to reduce the difference between the target steering angle and the actual steering angle. Thus, the direction of the thrust force of the outboard motor 3 is changed such that the turning is performed with the specified target turning radius. Then, the controller 11 returns to step S11.

According to various preferred embodiments of the present invention, the following advantageous effects are obtained.

According to a preferred embodiment of the present invention, the controller 11 controls the direction of the thrust force of the outboard motor 3 based on the target yaw rate value and the actual yaw rate value. Thus, when performing the orientation control for the boat 1, the controller 11 performs the orientation control by controlling the direction of the thrust force of the outboard motor 3 based on both the target yaw rate value (the change rate of the target orientation) and the actual yaw rate value (the change rate of the actual orientation), and hence the actual orientation of the boat 1 promptly converges on the target orientation as compared with the case where the controller 11 performs the orientation control for the boat 1 based on only the difference between the target orientation and the actual orientation of the boat 1 (a change in the orientation). Consequently, the controller 11 performs the stable orientation control. When performing the turning control for the boat 1, the controller 11 performs the turning control by controlling the direction of the thrust force of the outboard motor 3 based on both the target yaw rate value and the actual yaw rate value, and hence the controller 11 easily performs the turning control such as turning control of turning the boat 1 in a swirled fashion or the turning control in which the target turning radius is specified.

According to a preferred embodiment of the present invention, the controller 11 acquires the target orientation, acquires the actual orientation of the boat 1, and performs the orientation control for the boat 1 by controlling the direction of the thrust force of the outboard motor 3 based on the target yaw rate value and the actual yaw rate value so as to reduce the difference between the target orientation and the actual orientation. Thus, the actual orientation of the boat 1 easily converges on the target orientation.

According to a preferred embodiment of the present invention, the controller 11 controls the direction of the thrust force of the outboard motor 3 according to the difference between the target yaw rate value and the actual yaw rate value. Thus, the controller 11 performs the orientation control with high accuracy according to the difference between the target yaw rate value and the actual yaw rate value.

According to a preferred embodiment of the present invention, the controller 11 acquires the boat speed of the boat 1 and sets the target yaw rate value according to the boat speed in addition to the orientation information (the target orientation and the actual orientation). Thus, the controller 11 properly sets the target yaw rate value according to the boat speed of the boat 1 so as to properly perform the orientation control.

According to a preferred embodiment of the present invention, the controller 11 sets the target yaw rate value such that the absolute value of the target yaw rate value is decreased according to an increase in the boat speed. Thus, when the boat speed of the boat 1 is relatively large such that the boat 1 is likely to change its orientation, the controller 11 sets the absolute value of the target yaw rate value to be relatively small. When the boat speed of the boat 1 is relatively small such that the boat 1 is unlikely to change its orientation, the controller 11 sets the absolute value of the target yaw rate value to be relatively large. Consequently, the controller 11 more properly sets the target yaw rate value so as to more properly perform the orientation control.

According to a preferred embodiment of the present invention, the controller 11 sets the target yaw rate value according to the difference between the target orientation and the actual orientation. Thus, the controller 11 properly sets the target yaw rate value according to the difference between the target orientation and the actual orientation so as to properly perform the orientation control.

According to a preferred embodiment of the present invention, the controller 11 sets the target yaw rate value such that the absolute value of the target yaw rate value is increased according to an increase in the absolute value of the difference between the target orientation and the actual orientation. Thus, when the difference between the target orientation and the actual orientation is relatively large such that it is necessary to significantly change the orientation of the boat 1, the controller 11 sets the absolute value of the target yaw rate value to be relatively large. When the difference between the target orientation and the actual orientation is relatively small such that it is necessary to insignificantly change the orientation of the boat 1, the controller 11 sets the absolute value of the target yaw rate value to be relatively small. Consequently, the controller 11 more properly sets the target yaw rate value so as to more properly perform the orientation control.

According to a preferred embodiment of the present invention, the limit values are set for the target yaw rate value. Thus, the target yaw rate value is prevented from being set to be excessively large.

According to a preferred embodiment of the present invention, the controller 11 acquires the turning target orientation as the target orientation, acquires the actual orientation of the boat 1 during the turning of the boat 1 as the actual orientation of the boat 1, acquires the target turning information (target turning radius) about the boat 1, acquires the boat speed (actual boat speed) of the boat 1, sets the target yaw rate value based on the turning target orientation, the actual orientation, the target turning information, and the boat speed, and performs the turning control for the boat 1 by controlling the direction of the thrust force of the outboard motor 3 such that the actual yaw rate value approaches the target yaw rate value. Thus, the controller 11 controls the direction of the thrust force of the outboard motor 3 such that the actual yaw rate value approaches the target yaw rate value set based on the target turning information and the boat speed, and hence the controller 11 more easily performs the turning control such as the turning control of turning the boat 1 in a swirled fashion or the turning control in which the target turning radius is specified.

According to a preferred embodiment of the present invention, the controller 11 acquires the target turning radius of the boat 1 as the target turning information, sets the target yaw rate value based on the target turning radius and the boat speed, and turns the boat 1 with the target turning radius by controlling the direction of the thrust force of the outboard motor 3 such that the actual yaw rate value approaches the target yaw rate value. Thus, the controller 11 easily performs the turning control with the acquired target turning radius.

According to a preferred embodiment of the present invention, the controller 11 acquires the turning target orientation, acquires the actual orientation of the boat 1 during the turning of the boat 1, and sets the target yaw rate value based on the turning target orientation and the actual orientation. Thus, the controller 11 properly sets the target yaw rate value of the boat 1 during the turning based on the turning target orientation and the actual orientation so as to properly perform the turning control with the acquired target turning radius.

According to a preferred embodiment of the present invention, the controller 11 sets the fixed target yaw rate value based on the target turning radius and the boat speed when the actual orientation falls outside the predetermined angular range, and sets the target yaw rate value so as to reduce the difference between the turning target orientation and the actual orientation when the actual orientation falls within the predetermined angular range thereafter. Thus, the controller 11 stably performs the turning control with the fixed target yaw rate value until the actual orientation approaches the turning target orientation. After the actual orientation approaches the turning target orientation, the actual orientation easily converges on the turning target orientation by the target yaw rate value that allows a reduction in the difference between the turning target orientation and the actual orientation.

According to a preferred embodiment of the present invention, the controller 11 changes at least one of the control gain, the limit values of the target yaw rate value, and the limit values of the target steering angle set based on the target yaw rate value and the actual yaw rate value according to the boat speed. Thus, when the boat speed of the boat 1 is relatively small such that the boat 1 is unlikely to turn, for example, the controller 11 increases the control gain, the limit values of the target yaw rate value, and the limit values of the target steering angle. When the boat speed of the boat 1 is relatively large such that the boat 1 is likely to turn, for example, the controller 11 decreases the control gain, the limit values of the target yaw rate value, and the limit values of the target steering angle. Consequently, the controller 11 easily performs the turning control according to the boat speed.

According to a preferred embodiment of the present invention, the control gain, the limit values of the target yaw rate value, and the limit values of the target steering angle according to the boat speed are determined based on the magnitude of the centrifugal force based on the boat speed (actual boat speed) and the target turning information (target turning radius). Thus, the control gain, the limit values of the target yaw rate value, and the limit values of the target steering angle are determined based on the magnitude of the centrifugal force, and hence an excessive increase in the centrifugal force during the turning of the boat 1 is significantly reduced or prevented.

According to a preferred embodiment of the present invention, the controller 11 controls the direction of the thrust force of the outboard motor 3 by controlling the steering angle of the outboard motor 3. Thus, the controller 11 easily changes the direction of the thrust force of the outboard motor 3.

The preferred embodiments of the present invention described above are illustrative in all points and not restrictive. The extent of the present invention is not defined by the above description of the preferred embodiments but by the scope of the claims, and all modifications within the meaning and range equivalent to the scope of claims are further included.

For example, while the boat maneuvering control system for a boat preferably performs both the orientation control and the turning control in a preferred embodiment described above, the present invention is not restricted to this. According to a preferred embodiment of the present invention, the boat maneuvering control system for a boat may alternatively perform only one of the orientation control and the turning control.

While the selector and the controller are preferably integrally provided in the controller in a preferred embodiment described above, the present invention is not restricted to this. According to a preferred embodiment of the present invention, the selector and the controller may alternatively be provided separately from each other, or the selector and the controller may alternatively be provided in a device other than the controller.

While the outboard motor is preferably used as the propulsion device of the boat in a preferred embodiment described above, the present invention is not restricted to this. According to a preferred embodiment of the present invention, an inboard motor, a jet propulsion device, or the like may alternatively be used as the propulsion device of the boat, for example. The propulsion device may be an engine propulsion device, an electric motor propulsion device, or a hybrid propulsion device of an engine and an electric motor.

While the single outboard motor (propulsion device) is preferably provided in the boat in a preferred embodiment described above, the present invention is not restricted to this. According to a preferred embodiment of the present invention, two or more propulsion devices may alternatively be provided in the boat. When the two or more propulsion devices are provided in the boat, in addition to the direction of the thrust force of the propulsion device, the magnitude of the thrust force of the propulsion device may be controlled based on the target yaw rate value and the actual yaw rate value. In this case, a moment for turning the bow of the boat may be generated by controlling the magnitude of the thrust force of the propulsion device. Thus, in addition to the direction of the thrust force of the propulsion device, the magnitude of the thrust force is controlled such that the orientation control and the turning control are more easily performed. When the propulsion device includes the engine, the magnitude of the thrust force of the propulsion device may be controlled by controlling the throttle position of the engine of the propulsion device.

While the actual boat speed of the boat is preferably detected by the GPS device in a preferred embodiment described above, the present invention is not restricted to this. According to a preferred embodiment of the present invention, the actual boat speed of the boat may alternatively be detected by a device other than the GPS device. For example, the actual boat speed of the boat may be detected from a difference between static pressure and dynamic pressure by a pitot tube, or the actual boat speed of the boat may be detected from the number of rotations of a water wheel by a water wheel device.

While the target yaw rate value is preferably set according to the actual boat speed of the boat in a preferred embodiment described above, the present invention is not restricted to this. According to a preferred embodiment of the present invention, the target yaw rate value may alternatively be set according to the engine rotational speed of the engine of the outboard motor (propulsion device).

While the control gain, the limit values of the target yaw rate value, and the limit values of the target steering angle are preferably changed according to the actual boat speed of the boat in a preferred embodiment described above, the present invention is not restricted to this. According to a preferred embodiment of the present invention, the control gain, the limit values of the target yaw rate value, and the limit values of the target steering angle may alternatively be changed according to the engine rotational speed of the engine of the outboard motor (propulsion device). Furthermore, at least one of the control gain, the limit values of the target yaw rate value, and the limit values of the target steering angle may alternatively be changed.

While the target turning radius is preferably acquired as the target turning information such that the turning control in which the target turning radius is specified is performed in a preferred embodiment described above, the present invention is not restricted to this. According to a preferred embodiment of the present invention, information other than the target turning radius may alternatively be acquired as the target turning information. For example, a target turning pattern may be acquired as the target turning information. In this case, a swirled target turning pattern, a spiral target turning pattern, or the like may be acquired such that turning control of performing a swirled or spiral turning operation is performed.

While the target yaw rate value is preferably set according to the difference between the target orientation and the actual orientation in the orientation control in a preferred embodiment described above, the present invention is not restricted to this. According to a preferred embodiment of the present invention, the target yaw rate value may alternatively be set based on only the target orientation (target orientation itself) or based on only the actual orientation (actual orientation itself). Furthermore, the target yaw rate value may alternatively be set based on the amount of change in the target orientation or based on the amount of change in the actual orientation.

While the target yaw rate value is preferably set based on the turning target orientation and the actual orientation in the turning control in a preferred embodiment described above, the present invention is not restricted to this. According to a preferred embodiment of the present invention, the target yaw rate value may alternatively be set based on only the turning target orientation or based on only the actual orientation. Furthermore, the target yaw rate value may alternatively be set based on the amount of change in the turning target orientation or based on the amount of change in the actual orientation.

While the processing operations performed by the controller are described using a flowchart in a flow-driven manner in which processing is performed in order along a processing flow for the convenience of illustration in a preferred embodiment described above, the present invention is not restricted to this. According to a preferred embodiment of the present invention, the processing operations performed by the controller may alternatively be performed in an event-driven manner in which processing is performed on an event basis. In this case, the processing operations performed by the controller may be performed in a complete event-driven manner or in a combination of an event-driven manner and a flow-driven manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat maneuvering control method for a boat provided with a propulsion device, comprising:
    acquiring a target orientation;
    acquiring an actual orientation of the boat;
    setting a target yaw rate value based on orientation information of both of the target orientation and the actual orientation;
    detecting an actual yaw rate value of the boat; and
    controlling a direction of a thrust force of the propulsion device based on the target yaw rate value and the actual yaw rate value.

2. The boat maneuvering control method for a boat according to claim 1, wherein the target yaw rate value is set according to a difference between the target orientation and the actual orientation.

3. The boat maneuvering control method for a boat according to claim 2, wherein the target yaw rate value is set such that an absolute value of the target yaw rate value is increased according to an increase in an absolute value of the difference between the target orientation and the actual orientation.

4. The boat maneuvering control method for a boat according to claim 1, wherein the direction of the thrust force of the propulsion device is controlled according to a difference between the target yaw rate value and the actual yaw rate value.

5. The boat maneuvering control method for a boat according to claim 1, further comprising acquiring a boat speed of the boat; wherein
    the target yaw rate value is set according to the boat speed in addition to the orientation information.

6. The boat maneuvering control method for a boat according to claim 5, wherein the target yaw rate value is set such that an absolute value of the target yaw rate value is decreased according to an increase in the boat speed.

7. The boat maneuvering control method for a boat according to claim 1, wherein a limit value is set for the target yaw rate value.

8. The boat maneuvering control method for a boat according to claim 1, further comprising:
    acquiring target turning information about the boat; and
    acquiring a boat speed of the boat; wherein
    a turning target orientation is acquired as the target orientation;
    the actual orientation of the boat during turning of the boat is acquired as the actual orientation of the boat;
    the target yaw rate value is set based on the orientation information of at least one of the turning target orientation and the actual orientation, the target turning information, and the boat speed; and
    turning control for the boat is performed by controlling the direction of the thrust force of the propulsion device such that the actual yaw rate value approaches the target yaw rate value.

9. The boat maneuvering control method for a boat according to claim 8, wherein
    a target turning radius of the boat is acquired as the target turning information;
    the target yaw rate value is set based on the target turning radius and the boat speed; and
    the boat is turned with the target turning radius by controlling the direction of the thrust force of the propulsion device such that the actual yaw rate value approaches the target yaw rate value.

10. The boat maneuvering control method for a boat according to claim 9, wherein the target yaw rate value is set based on the turning target orientation and the actual orientation.

11. The boat maneuvering control method for a boat according to claim 10, wherein the target yaw rate value that is fixed is set based on the target turning radius and the boat speed when the actual orientation falls outside a predetermined angular range, and the target yaw rate value is set so as to reduce a difference between the turning target orientation and the actual orientation when the actual orientation falls within the predetermined angular range thereafter.

12. The boat maneuvering control method for a boat according to claim 8, wherein at least one of a control gain, a limit value of the target yaw rate value, and a limit value of a target steering angle set based on the target yaw rate value and the actual yaw rate value is changed according to the boat speed.

13. The boat maneuvering control method for a boat according to claim 12, wherein the control gain, the limit value of the target yaw rate value, and the limit value of the target steering angle according to the boat speed are determined based on a magnitude of a centrifugal force based on the boat speed and the target turning information.

14. The boat maneuvering control method for a boat according to claim 1, wherein in addition to the direction of the thrust force of the propulsion device, a magnitude of the thrust force of the propulsion device is controlled based on the target yaw rate value and the actual yaw rate value.

15. The boat maneuvering control method for a boat according to claim 1, wherein the direction of the thrust force of the propulsion device is controlled by controlling a steering angle of the propulsion device.

16. A boat maneuvering control system for a boat, comprising:
    a propulsion device;
    a selector that acquires a target orientation, acquires an actual orientation of the boat, and sets a target yaw rate value based on orientation information of both of the target orientation and the actual orientation;
    a yaw rate detector that detects an actual yaw rate value of the boat; and
    a controller configured or programmed to control a direction of a thrust force of the propulsion device based on the target yaw rate value and the actual yaw rate value.

17. The boat maneuvering control system for a boat according to claim 16, wherein the selector sets the target yaw rate value based on a difference between the target orientation and the actual orientation.

18. The boat maneuvering control system for a boat according to claim 16, wherein
    the selector acquires a turning target orientation as the target orientation, acquires the actual orientation of the boat during turning of the boat as the actual orientation of the boat, acquires target turning information about the boat, acquires a boat speed of the boat, and sets the target yaw rate value based on the orientation information of at least one of the turning target orientation and the actual orientation, the target turning information, and the boat speed; and
    the controller is configured or programmed to perform turning control for the boat by controlling the direction of the thrust force of the propulsion device such that the actual yaw rate value approaches the target yaw rate value.

* * * * *